United States Patent [19]

Profio et al.

[11] 4,139,240
[45] Feb. 13, 1979

[54] CRAWLER SHOE AND METHOD FOR MAKING SAME

[75] Inventors: Richard L. Profio, Wauwatosa; Neil E. Borgman, Muskego, both of Wis.

[73] Assignee: Harnischfeger Corporation, Milwaukee, Wis.

[21] Appl. No.: 824,716

[22] Filed: Aug. 15, 1977

[51] Int. Cl.² ............................................. B62D 55/20
[52] U.S. Cl. .................... 305/39; 29/148.3; 305/57
[58] Field of Search .................. 305/39, 56, 57, 58 R, 305/60; 29/148.3

[56] References Cited

U.S. PATENT DOCUMENTS

| 2,452,921 | 11/1948 | Gillespie | 305/57 X |
| 3,307,882 | 3/1967 | McFayden | 305/56 |

FOREIGN PATENT DOCUMENTS

| 135286 | 4/1952 | Sweden | 305/56 |

Primary Examiner—John P. Shannon
Attorney, Agent, or Firm—James E. Nilles

[57] ABSTRACT

A crawler shoe for the crawler tracks of a heavy-duty mining shovel or the like weighing 500 tons or more comprises a solid main body formed of high strength tempered steel plate (i.e., 100,000 P.S.I. yield strength), integrally formed projections, recesses, and pin holes on the body for detachably and articulately connecting the shoe to an adjacent shoe, end gussets welded to and projecting from the lateral sides of the body, a roller path plate of moderately hard high strength steel (i.e., between about 300 and 350 B.H.N.) welded to the upper surface of the main body, a pair of hollow drive lugs welded to the upper surface of the body on opposite sides of said roller path plate and formed of cast austenitic manganese steel, and a belly pan of high strength high hardness abrasion-resistant steel plate (i.e., between about 341 and about 391 B.H.N.) welded to the underside of the main body and the gussets.

The method for making the crawler shoe generally comprises the steps of: tempering by heat treatment high yield sheet steel; flame cutting the main body from the tempered high yield sheet steel to desired shape; drilling the pin holes; forming the roller path plate by depositing by welding moderately hard high strength steel on the upper surface of the main body and welding other components in place. An alternative method involves integrally forming an assembly comprising the roller path plate and hollow drive lugs by forging and welding this assembly to the upper surface of the main body.

10 Claims, 9 Drawing Figures

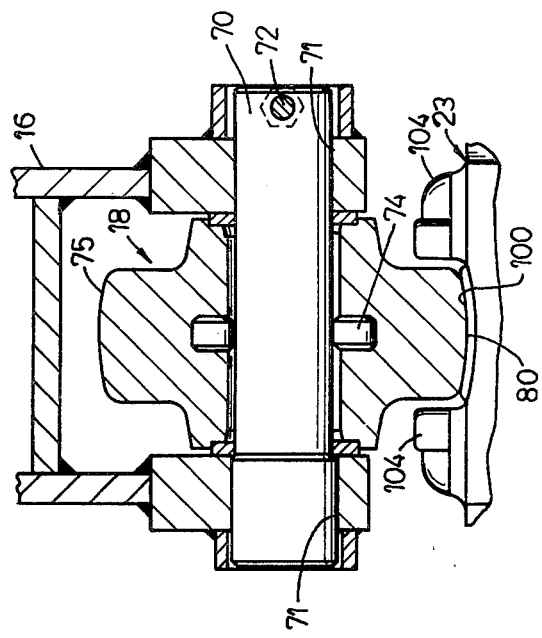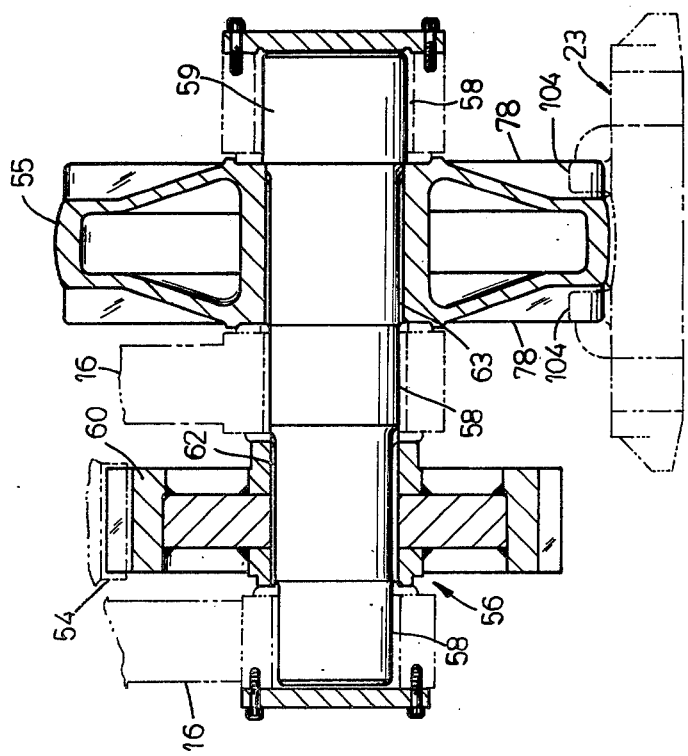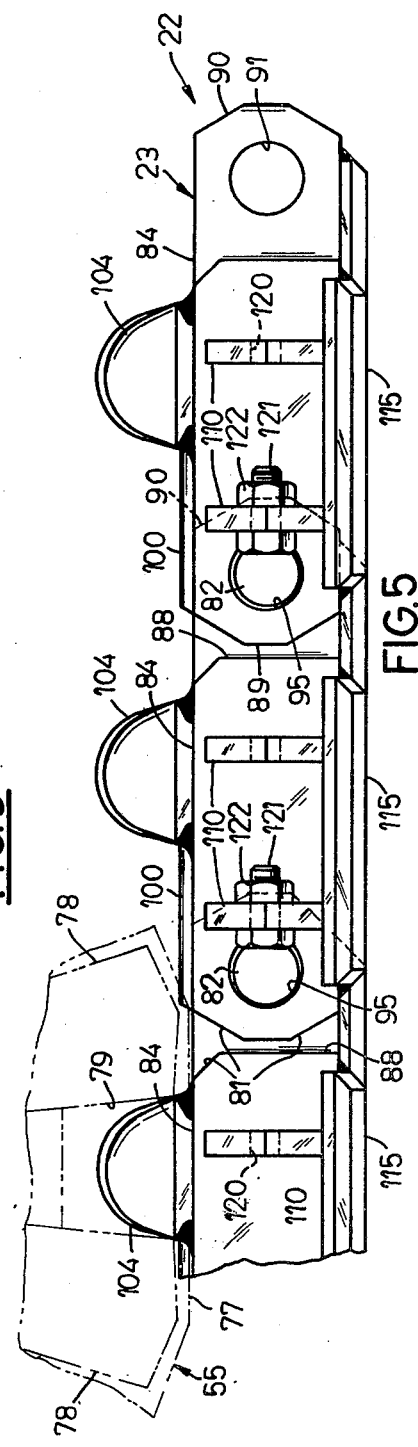

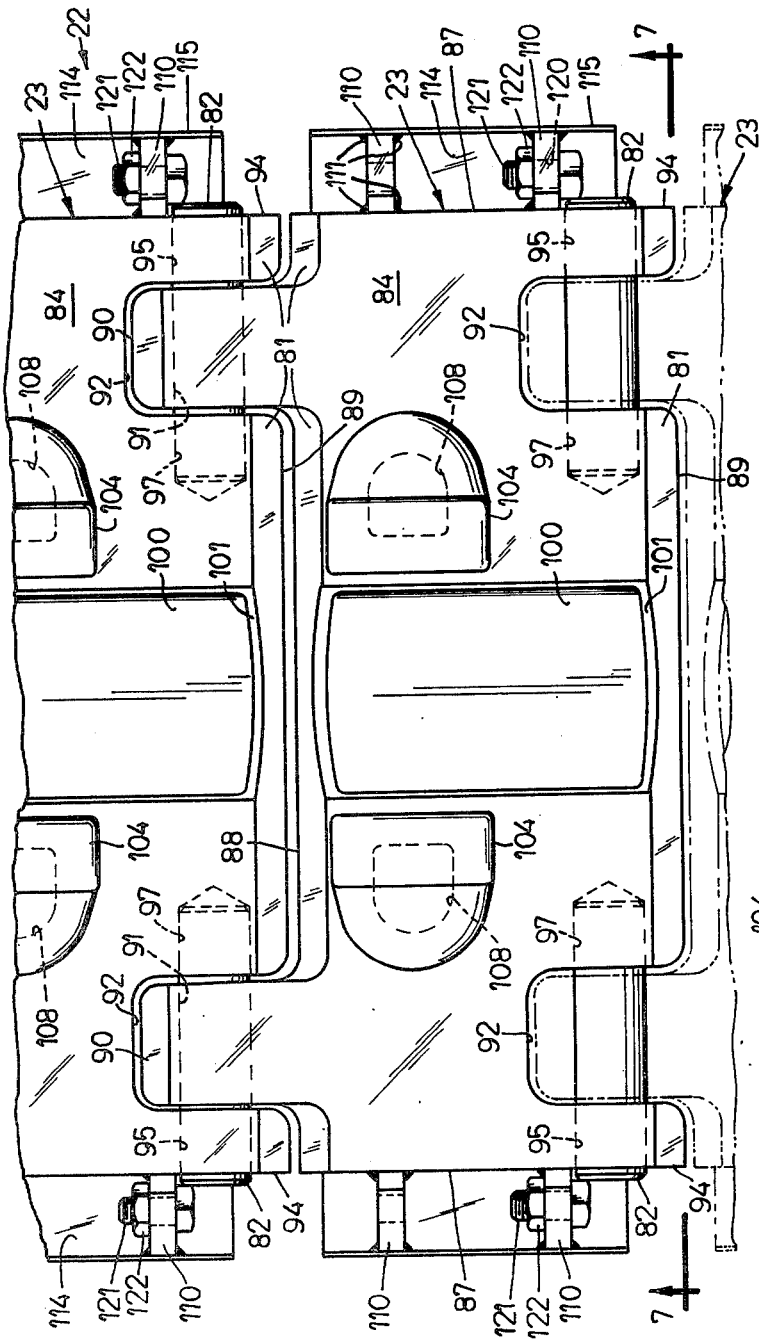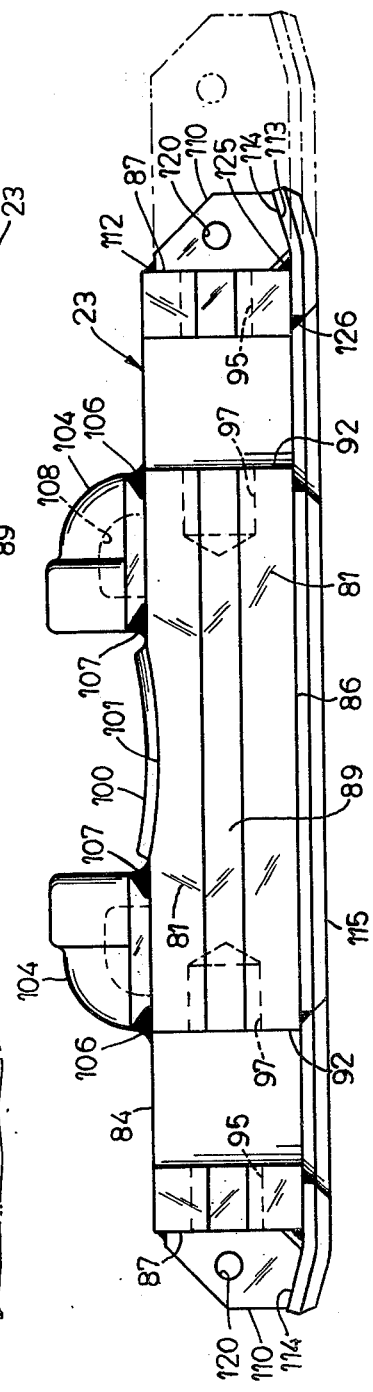

CRAWLER SHOE AND METHOD FOR MAKING SAME

BACKGROUND OF THE INVENTION

1. Field of Use

This invention relates generally to crawler shoes used in crawler tracks for mining shovels or other heavy-duty equipment and to methods for making such crawler shoes.

2. Description of the Prior Art

The crawler shoes of crawler tracks used in heavy-duty equipment such as mining shovels are subjected to wear and tear resulting from operation in dust, mud, and highly abrasive soils, shock loads, and other severe operating conditions. Adjacent shoes in a crawler track are connected to one another by means of removable, replaceable pins which permit articulation of adjacent shoes and also enable shoes to be replaced as they become worn. Such crawler shoes are relatively large, being on the order of up to five feet wide, for example, and heretofore have been made by casting alloy steel. In a typical crawler track, heavy-duty forged or cast alloy steel rollers ride upon the upper surface of each shoe and transfer crushing loads thereto from the heavy machinery thereabove. The life of crawler shoes can be extended by using different metals having desired properties and by designing the shoe to achieve desired load distribution thereacross. Even so, operating conditions are very severe and such shoes must be frequently replaced. Such shoes are very expensive and downtime on the machine and labor costs result in additional expense during shoe replacement.

Heretofore, crawler shoes for mining shovels were manufactured by casting and, to reduce weight, had hollow cores or chambers on the interior thereof. Such construction posed serious problems during manufacture of the shoes. For example, sand in which the shoe was cast burned into the casting on the exterior and interior surfaces thereof causing defects. Furthermore, because the castings were large, shrinkage of the metal and cracking occurred as the casting cooled creating flaws and undesirable internal stresses which weakened the shoe and imposed the risk of damage or breakage during use. Also, shifting of the internal cores during the casting process caused variations in metal thickness thereby producing weak points. Furthermore, in shoes formed by casting, it is necessary for the same material to be used throughout a single cast piece even though material requirements such as strength, hardness, ductility, and toughness vary from one area to another on the shoe, depending on the type of loads and operating conditions imposed on the shoes during operation. The prior art contains many examples of attempts to design and fabricate track shoes which overcome the aforementioned and other problems. For example, U.S. Pat. No. 3,477,769 discloses a crawler shoe which is fabricated of numerous sub-components each made of a material having certain desirable properties and wherein the several components are secured together by means of large bolts.

SUMMARY OF THE INVENTION

In accordance with the present invention, there is provided a track shoe for use in the crawler tracks of heavy-duty machinery such as mining shovels and the like weighing 500 tons or more. A crawler shoe in accordance with the invention comprises a solid main body formed of high strength tempered steel plate, integrally formed means including projections, recesses, and pin holes on the body for detachably and articulately connecting the shoe to an adjacent shoe, end gussets welded to and projecting from the lateral sides of the body, a roller path plate of moderately hard high strength steel welded to the upper surface of the main body, a pair of hollow drive lugs welded to the upper surface of the body on opposite sides of said roller path plate and formed of cast austenitic manganese steel, and a belly pan of high strength high hardness abrasion-resistant steel plate welded to the underside of the main body and the gussets.

The method in accordance with the invention for making the crawler shoe generally comprises the steps of: tempering by heat treatment high yield sheet steel; flame cutting the main body from the tempered high yield sheet steel to desired shape; drilling the pin holes; forming the roller path plate by depositing by welding moderately hard high strength steel on the upper surface of the main body and welding other components in place. An alternative method involves integrally forming an assembly comprising the roller path plate and hollow drive lugs by forging and welding this assembly to the upper surface of the main body. A track shoe in accordance with the invention comprises components fabricated of different types of steel, each selected to have the best characteristics for that portion of the track shoe wherein it is used, taking into account the nature of the loads imposed thereon.

The main body of the shoe is flame cut from a quenched and tempered, high strength plate with excellent low temperature impact properties. The belly pan is a high strength, high hardness plate selected to provide resistance to abrasive wear since it is in contact with the ground. The two drive lugs are austenitic manganese castings selected to provide a surface that will work harden in service to about 400 B.H.N. The roller path consists of a very high strength and moderately hard weld deposit best suited to resist the rolling and crushing loads imposed by the roller.

A track shoe in accordance with the invention has several advantages over prior art shoes. For example, a track shoe in accordance with the invention is relatively economical and easy to fabricate. Furthermore, the shoe can be repaired in the field by replacement of components such as the drive lugs, the belly pan, or both. Since all materials used in the shoe are fabricated of steels which are readily weldable, and are secured together by welding during manufacturing, all worn components can be cut free and replacement components can be welded in place in the field. Even the main body of the shoe can be repaired using ordinary welding equipment and techniques. In addition, the width of a particular shoe can be varied during manufacture by providing belly pans of different widths for attachment to main bodies of some predetermined width. Such variation can also be carried out in the field and this is important since allowable ground bearing pressures may vary from mine to mine and in some cases within a given mine. Since, as hereinbefore mentioned, a solid casting is subject to the occurrence of internal flaws in the regions of largest cross section, and since hollow core shoes are relatively weaker than solid core cast shoes, a track shoe fabricated in accordance with the invention wherein the main body of the shoe is flame cut from high strength solid steel plate provides substantially greater strength than prior art arrangements.

Other objects and advantages of the invention will hereinafter appear.

BRIEF DESCRIPTION OF THE DRAWINGS

FIG. 3 is an enlarged cross section of the crawler drive shaft assembly taken on line 3—3 of FIG. 2;

FIG. 4 is an enlarged cross-sectional view of a crawler roller assembly taken on line 4—4 of FIG. 1;

FIG. 5 is an enlarged side elevational view of several track shoes in accordance with the invention joined together to form a crawler track;

FIG. 6 is a top plan view of the crawler track shown in FIG. 5;

FIG. 7 is an end elevational view of a track shoe and is taken on line 7—7 of FIG. 6;

DESCRIPTION OF PREFERRED EMBODIMENTS

Figure 1:
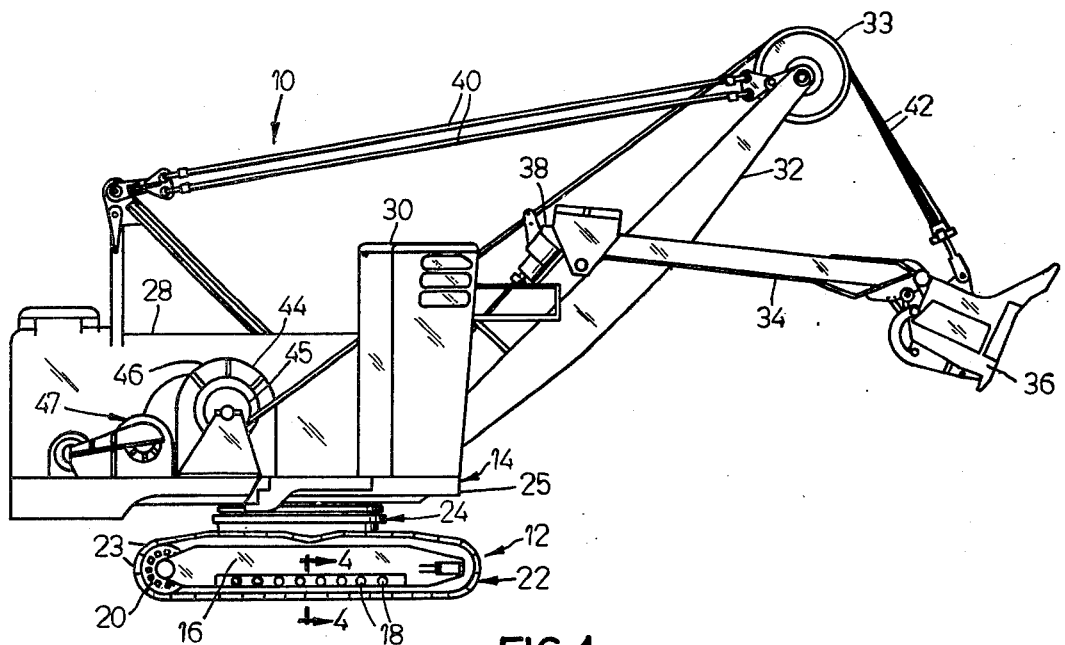
FIG. 1 is a side elevational view of a heavy-duty mining shovel having crawler tracks with track shoes in accordance with the present invention.

FIG. 1 shows a mining shovel 10 of a type wherein crawler tracks in accordance with the invention are advantageously used. Mining shovel 10, which is on the order of fifty feet high and weighs about 500 or more tons, comprises a lower section 12 and a rotatable upper section 14 mounted thereon. Lower section 12 comprises a crawler frame 16 on which are mounted a plurality of crawler roller assemblies 18 and propelling machinery 20. A pair of crawler tracks 22 employing crawler shoes 23 in accordance with the invention are mounted on the roller assemblies 18 and on the propelling machinery 20. Crawler frame 16 supports a slew ring assembly 24 on which upper section 14 is rotatably mounted. Upper section 14 comprises a revolvable frame 25 on which are mounted a machine house 28, an operator's cab 30, a pivotable boom 32 having a sheave 33 at the upper end thereof, a dipper handle 34 having a dipper or scoop 36 at one end thereof, and crowd machinery 38 at the other end thereof. Boom 32 is supported by suitable cables 40. Dipper 36 is connected by cables 42 which are reeved over sheave 33 and connected to hoist machinery 44 on the upper frame 25. The hoist machinery 44 includes a winch 45 which is driven through hoist gearing 46 by an electric motor 47. The hoist machinery 44 serves solely to hoist the dipper 36, whereas the dipper handle 34 is operated by the crowd machinery 38.

Figure 2:
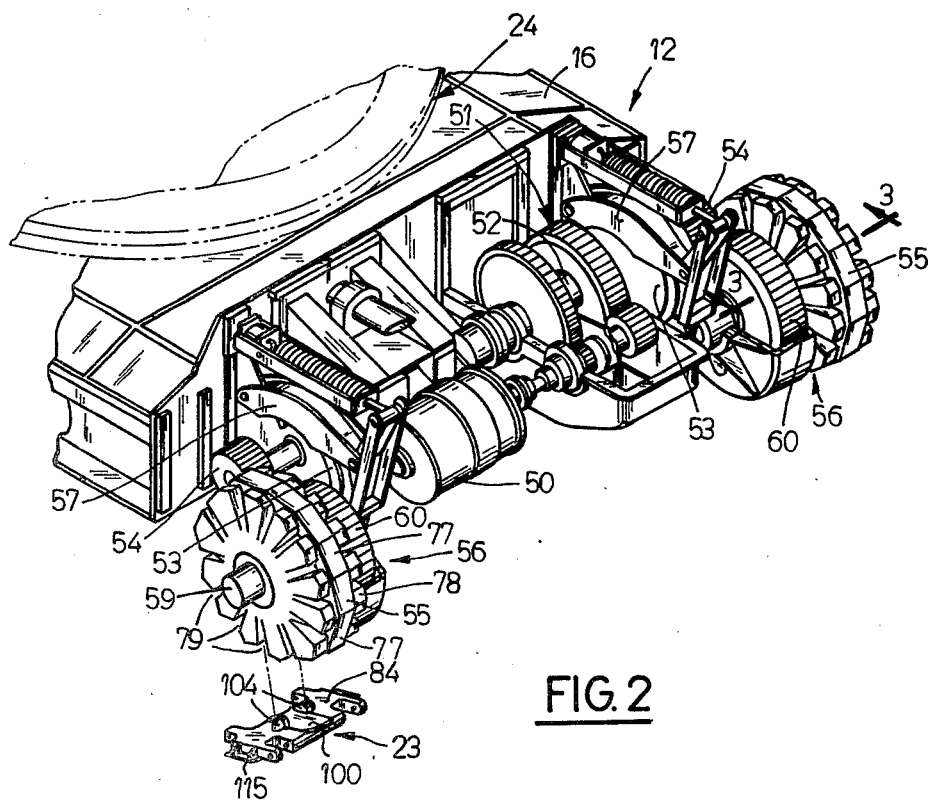
FIG. 2 is an enlarged perspective view of the track propulsion machinery of the shovel shown in FIG. 1.

Referring to FIG. 2, the crawler tracks 22 are driven by the propelling machinery 20 which comprises a reversible electric propelling motor 50, a propel transmission 51, and a propelling shaft 52 which operates through a pair of steering jaw clutches 53 and final reduction pinnion gears 54 to drive a pair of crawler drive tumblers 55 in the conventional manner. A pair of brake assemblies 57 are provided for the shafts on which the pinnion gears 54 are mounted. Propelling machinery 20 of the type shown in FIG. 2 is described in detail in bulletin RX-2100BL-1-2-71 entitled "Model 2100BL" Crawler Mounted Excavator and published by Harnischfeger Corporation, Box 554, Milwaukee, WI 53201.

As FIGS. 2 and 3 show, each crawler drive tumbler 55 is part of a crawler drive shaft assembly 56 which is supported on crawler frame 16. The assembly 56 comprises a drive shaft 59 which is journalled for rotation on bushings 58 which are supported by frame 16. A drive gear 60 which is in constant mesh with final reduction pinnion gear 54 is keyed to shaft 59 at 62 and the crawler drive tumbler 55 is also keyed to shaft 59 at 63. Thus, rotation of pinnion gear 54 effects rotation of drive gear 60, shaft 59, and crawler drive tumber 55. Crawler drive tumbler 55 comprises a plurality of segments 77 around the periphery thereof which as FIG. 3 shows, are slightly cambered. Tumbler 55 further comprises a pair of lug-engaging members 78 which are located on either end of a line along which two adjacent segments 77 join. A lug-receiving space 79 is provided between each pair of adjacent lug-engaging members 78 on a side of the drive tumbler 55.

As FIGS. 1 and 4 show, each crawler track 22 cooperates with a plurality of (eight) crawler roller assemblies 18 which are supported on crawler frame 16. Each crawler roller assembly 18 comprises a shaft 70 which is journalled and supported in openings 71 in frame 16 and secured in place by a coupling bolt and nut 72. Shaft 70 supports bushings 74 on which a track roller 75 rotates. Track roller 75 is a forged alloy steel roller having a smooth circular slightly crowned circumferential surface 80.

Referring now to FIGS. 5, 6, 7, and 8, a crawler track 22 will now be described in detail. As FIGS. 5 and 6 best show, each crawler track 22 is identical to the other and each crawler track comprises a plurality of crawler shoes 23 which are identical to one another. Each pair of adjacent crawler shoes 23 are joined together by a pair of track pins 82.

Crawler shoe 23 comprises a solid main body 84 which is flame cut from a sheet of high strength steel plate which is heat treated and quenched before it is cut and formed to the desired shape so as to provide a high strength plate with excellent low temperature impact properties. The plate has a minimum yield strength on the order of about 100,000 P.S.I.. Main body 84 is provided with kerfed or bevelled edges as at 81 in FIG. 8. During the cutting process, main body 84 is shaped so as to provide a generally rectangular member having an upper surface 85, a lower surface 86, opposite lateral sides 87, a front side 88 and a rear side 89. As a practical matter, either side 88 or 89 could serve as a front or rear side and this terminology is merely used for identification purposes in the following discussion. Main body 84 is shaped during the flame cutting operation so as to provide a pair of link pin lugs or projections 90 which extend from the front side 88 of main body 84. Each link pin lug 90 is provided with a pin hole 91 which is drilled through the lug 90 after flame cutting. Main body 84 is also provided with a pair of indentations or recesses 92 which extend inwardly from rear side 89 and which are in alignment with the link pin lugs 90. The recesses 92 are adapted to receive the link pin lugs 90 of an adjacent crawler shoe 23 as FIG. 6 shows. Provision of the recesses 92 results in formation of wings 94 at opposite lateral sides 87 of main body 84. Each wing 94 is provided with a pin hole 95 which is drilled therethrough after flame cutting. Each pin hole 95 is in axial alignment or registry with another pin hole 97 which is drilled into the main body 84 and is generally parallel to the rear side 89 of main body 84. The pin holes 95 and 97 at an end of the main body 84 are formed during the same drilling operation after flame cutting.

Figure 9:
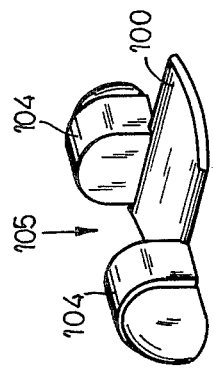
FIG. 9 is a perspective view of a unitary assembly which is welded to and forms a part of the track shoe shown in FIG. 8.
Figure 8:
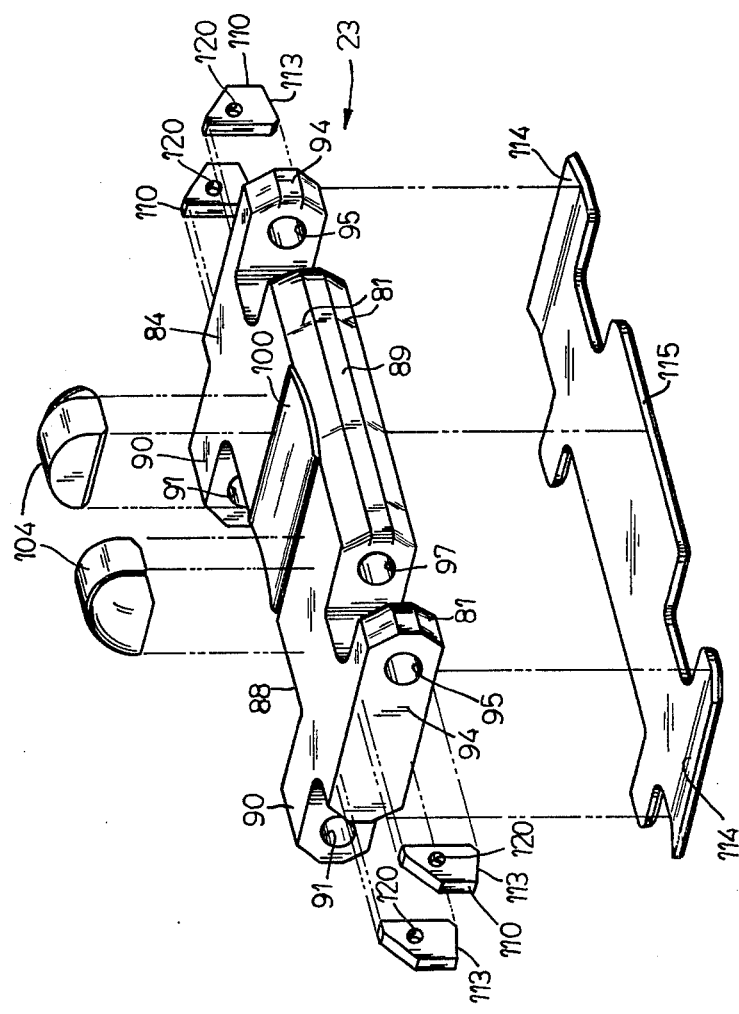
FIG. 8 is an exploded perspective view of the track shoe shown in FIGS. 5, 6, and 7.

Main body 84 is provided on its upper surface 85 with a roller path plate 100. As FIGS. 7 and 8 show, the roller path plate 100 is formed or mounted in a slightly curved or cambered recess 101 which is formed in the upper surface 85 of main body 84 by a conventional machining process after flame cutting. The roller path plate 100 is formed of moderately hard high strength steel, i.e., between about 300 and about 350 B.H.N. (Brinell Hardness Number). Roller path plate 100 may be formed in any one of several ways. For example, plate 100 may initially take the form of a steel plate which is cut and bent to shape and subsequently welded in recess 101. Or, roller path plate 100 can be formed by depositing molten weld material in recess 101. Or, as hereinafter explained in connection with FIG. 9, roller path plate 100 may be formed integral with a pair of drive lugs 104 by forging to provide a unitary assembly 105, shown in FIG. 9, which is then welded into position on main body 84. Returning again to the embodiment shown in FIG. 8, after roller path plate 100 is mounted on main body 84, the drive lugs 104 are disposed on opposite lateral sides of plate 100 and welded into position as by welds 106 and 107. Each drive lug 104 is formed of cast austinitic manganese steel, as FIGS. 6 and 7 show, each drive lug 104 has a cavity 108 therewithin. The nature of the material of which the drive lug 104 is made is such as to provide a surface of engagement with the lug engaging members 78 on the drive tumblers 55 which will work harden in service when under pressure. In the embodiment shown in FIG. 9, the unit 105 comprises lugs 104 which are integral with the roller path plate 100. In the embodiment shown in FIG. 9, the entire assembly 105 is welded to the upper surface 85 of main body 84.

Main body 84 is provided at its opposite lateral sides 87 with gussets 110, two spaced apart gussets 110 preferably being provided at each side 87. Each gusset 110 is secured as by welds 111 (FIG. 6) and 112 (FIG. 7). Each gusset has an upwardly sloped bottom edge 113 against which the upwardly sloped outer end sections 114 of a belly pan 115, hereinafter described, bear. As FIG. 7 shows, the gussets 110 may have various lengths so as to accommodate belly pans 115 of different widths. This modification may be carried out during manufacture or in the field. Each gusset 110 is provided with a bolt hole 120 for accommodating a bolt 121 which extends therethrough and which is secured in place by a nut 122. As FIGS. 5 and 6 show, the head of the bolt 121 lies adjacent to the flat projecting end of a pin 82 when the latter is in place and prevents undesired dislodgement of the pin 82 from the holes 95 and 97 in main body 84 and from hole 91 in an adjacent crawler shoe 23.

The belly pan 115 is preferably fabricated by cutting from high strength high hardness abrasion-resistant steel plate (i.e., between about 341 and about 391 B.H.N.) and has a contour which generally corresponds to the contour of the main body 84. The belly pan 115 is secured to the lower surface 86 of main body 84 as by welding at 125 and 126. The belly pan 115 is fabricated of a steel plate made of such material as to provide resistance to abrasive wear since the belly pan 115 is in direct contact with the ground.

As is apparent from the foregoing description of crawler shoe 23, each component part thereof is fabricated of steel which has the best wear and working properties for the function which it carries out. Furthermore, the component parts such as the roller path plate 100, the drive lugs 104, the belly pan 115, and the gussets 110 are secured by welding to main body 84 and when necessary, can be easily cut off of main body 84 after the component part is worn down and replaced by a similar component. Furthermore, the pins 82, when worn, can easily be replaced by removal of the bolt 121 and the nut 122, withdrawal of the worn pin 82, and replacement by a new pin 82.

The method for making a crawler shoe 23 in accordance with the present invention comprises the following steps. For example, sheet steel of the requisite properties is subjected to heat treatment to further improve its strength and wear properties. Main body 84 is then flame cut to desired shape from the heat treated and quenched sheet steel having the desired properties. Then, the recess 101 and the several holes 91, 95, and 97 are drilled and the kerfs 81 are formed. After this, the roller path plate 100 is provided on the main body 84 either by depositing molten weld, or welding a preformed piece of sheet steel in position, or by welding the unitary assembly 105, shown in FIG. 9, into position. Assuming the method of manufacture wherein roller path plate 100 is formed either by depositing weld or by welding a sheet of steel in place, then the drive lugs 104 previously formed by casting are welded in place. Thereafter, the gussets 110 are secured in place by welding and finally the belly pan 115 is welded into position.

It is apparent that the drive lugs 104, the roller path plate 100, gussets 110, and the belly pan 115 could be assembled in a different order than above described.

We claim:
1. A crawler shoe comprising:
a solid main body formed of steel plate and having an upper surface, a lower surface, opposite lateral sides and opposite front and rear sides;
means on said main body for articulately and releasably connecting said crawler shoe to an adjacent crawler shoe;
a roller path plate welded on said upper surface of said main body;
drive lugs welded to said upper surface of said main body on opposite sides of said roller path plate;
a belly pan formed of steel plate welded to said lower surface of said main body;
and end gussets welded to and projecting from said opposite lateral sides of said main body, said belly pan also being welded to said gussets.

2. A crawler shoe comprising:
a solid main body formed of steel plate and having an upper surface, a lower surface, opposite lateral sides and opposite front and rear sides;
means on said main body for articulately and releasably connecting said crawler shoe to an adjacent crawler shoe;
a roller path plate welded on said upper surface of said main body, said roller path plate being formed of steel weld deposited on said upper surface of said main body;
drive lugs welded to said upper surface of said main body on opposite sides of said roller path plate;
and a belly pan formed of steel plate welded to said lower surface of said main body.

3. A crawler shoe comprising:

a solid main body formed of steel plate and having an upper surface, a lower surface, opposite lateral sides and opposite front and rear sides;

means on said main body for articulately and releasably connecting said crawler shoe to an adjacent crawler shoe;

a roller path plate welded on said upper surface of said main body;

drive lugs welded to said upper surface of said main body on opposite sides of said roller path plate;

and a belly pan formed of steel plate welded to said lower surface of said main body;

said main body being formed of tempered steel plate of a predetermined degree of strength;

said roller path plate being formed of steel of said predetermined degree of strength and of a predetermined degree of hardness;

said drive lugs being formed of austenitic manganese steel;

and said belly pan being formed of abrasion-resistant steel plate of said predetermined degree of strength and of a degree of hardness higher than said predetermined degree of hardness.

4. A crawler shoe comprising:

a solid main body formed of tempered steel plate of a predetermined degree of strength and having an upper surface, a lower surface, opposite lateral sides and opposite front and rear sides;

means on said main body for articulately and releasably connecting said crawler shoe to an adjacent crawler shoe;

a roller path plate formed of steel welded on said upper surface of said main body, said roller path plate being of said predetermined degree of strength and having a predetermined degree of hardness;

drive lugs formed of austinitic manganese steel welded to said upper surface of said main body on opposite sides of said roller path plate;

end gussets welded to and projecting from said opposite lateral sides of said main body;

and a belly pan formed of abrasion-resistant steel plate welded to said lower surface of said main body and to said gussets, said belly pan being of said predetermined degree of strength and of a degree of hardness higher than said predetermined degree of hardness.

5. A crawler shoe comprising:

a solid main body formed of steel plate and having an upper surface, a lower surface, opposite lateral sides and opposite front and rear sides;

means on said main body for articulately and releasably connecting said crawler shoe to an adjacent crawler shoe, said means comprising at least one projection on said front side of said body and at least one indentation on said rear side of said body, said body having a pin hole in said projection and having a pin hole to adjust said indentation;

a roller path plate welded on said upper surface of said main body;

drive lugs welded to said upper surface of said main body on opposite sides of said roller path plate;

end gussets welded to and projecting from said opposite lateral sides of said main body;

and a belly pan formed of steel plate welded to said lower surface of said main body and to said gussets.

6. A crawler shoe according to claim 5 wherein said roller path plate and said drive lugs are integrally formed.

7. A crawler shoe according to claim 5 wherein at least one gusset has a bolt hole therethrough for receiving a bolt in interfering relationship with a pin in one of said pin holes to prevent removal of said bolt.

8. A method for making a crawler shoe comprises the steps of:

tempering by heat treatment sheet steel of a predetermined degree of strength;

flame cutting a main body of desired shape from the tempered sheet steel;

drilling pin holes in said main body;

welding a roller path plate to the upper surface of said main body; and providing other components including at least one drive lug and a belly pan and welding said components to said main body.

9. A method according to claim 8 wherein the step of welding said roller path plate to said upper surface of said main body comprises the step of depositing weld of steel on said upper surface of said main body, said weld of steel being of said predetermined degree of strength and of a predetermined degree of hardness.

10. A method according to claim 8 wherein the step of forming said roller path plate embodies the step of forming said plate of steel and welding it to said upper surface of said main body, said plate of steel being of a degree of strength less than said predetermined degree of strength.

* * * * *